(12) United States Patent
Lu et al.

(10) Patent No.: US 11,070,620 B1
(45) Date of Patent: Jul. 20, 2021

(54) EFFICIENT TRANSFER TO AND FROM A DEDUPLICATED CLOUD STORAGE SYSTEM

(71) Applicant: EMC IP Holding Company LLC, Hopkinton, MA (US)

(72) Inventors: Kimberly R. Lu, Sunnyvale, CA (US); Nicholas A. Noto, Sunnyvale, CA (US); Philip N. Shilane, Newtown, PA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 0 days.

(21) Appl. No.: 16/831,554

(22) Filed: Mar. 26, 2020

(51) Int. Cl.
*H04L 29/08* (2006.01)
*H04L 12/24* (2006.01)
*H04L 29/06* (2006.01)

(52) U.S. Cl.
CPC ...... *H04L 67/1097* (2013.01); *H04L 41/0803* (2013.01); *H04L 67/42* (2013.01)

(58) Field of Classification Search
CPC .. H04L 67/1097; H04L 67/42; H04L 41/0803
See application file for complete search history.

(56) References Cited

U.S. PATENT DOCUMENTS

| | | | |
|---|---|---|---|
| 9,372,809 B2 * | 6/2016 | Testardi | G06F 11/1448 |
| 9,396,341 B1 * | 7/2016 | Chandra | H04L 63/0428 |
| 2010/0332401 A1 * | 12/2010 | Prahlad | H04L 63/0428 705/80 |
| 2013/0041872 A1 * | 2/2013 | Aizman | G06F 16/182 707/690 |
| 2019/0042649 A1 * | 2/2019 | Meau | G06F 16/9574 |
| 2020/0034451 A1 * | 1/2020 | Danilov | G06F 3/067 |
| 2020/0259636 A1 * | 8/2020 | Gottipati | H04L 9/0822 |

* cited by examiner

*Primary Examiner* — El Hadji M Sall
(74) *Attorney, Agent, or Firm* — Workman Nydegger

(57) ABSTRACT

Efficient data transfer is disclosed. A server provides an endpoint for a client. The client can communicate with a cloud storage system through the server rather than connect directly to the cloud storage system. The server is configured to perform requests in a manner that reduces the amount of data transferred to and from the cloud storage system.

14 Claims, 7 Drawing Sheets ies of the invention relate to systems, hardware,
EFFICIENT TRANSFER TO AND FROM A DEDUPLICATED CLOUD STORAGE SYSTEM

FIELD OF THE INVENTION

Embodiments of the present invention generally relate to efficient data transfer. More particularly, at least some embodiments of the invention relate to systems, hardware, software, computer-readable media, and methods for efficiently transferring data in computing networks including efficiently transferring data to and from deduplicated cloud storage systems.

BACKGROUND

Cloud storage systems can be used for a variety of purposes including, for example, disaster recovery, replication, backups, production data, and the like. One of the benefits of cloud storage systems is that clients can access the data from just about anywhere there is a network connection.

This benefit, however, is associated with potential problems. When a client is not located near the cloud-based storage, the client may be subject to network latencies, data transfer times, network access, and the like.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to efficient data transfer to and from storage systems including cloud-based storage systems. More particularly, at least some embodiments of the invention relate to systems, hardware, software, computer-readable media, and methods for efficiently transferring data to and from a cloud or network storage system and to efficiently transferring data to and from a deduplicated cloud or network storage system.

Figure 1:
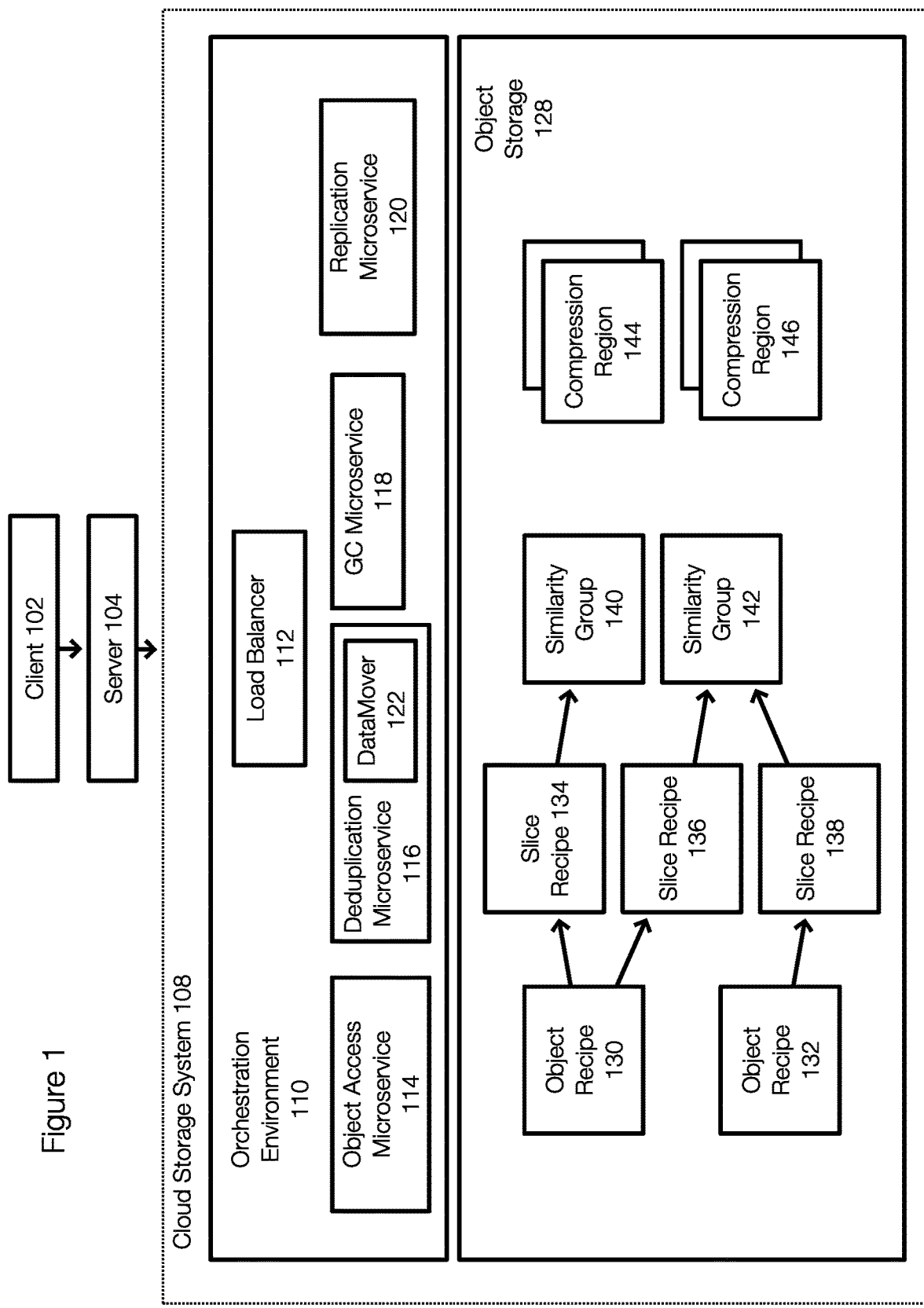
FIG. 1 discloses an example of a client that transfers data to and from a cloud storage system through a server and illustrates an example of how objects are stored in the cloud storage system.

FIG. 1 illustrates an example of a computing system in which data is transferred efficiently to and from a cloud storage system. This system includes a client 102, a server 104, and a cloud storage system 108. The clients, servers, and cloud storage systems illustrated in other Figures are examples of the client 102, the server 104, and the cloud storage 108 and are cumulative.

Before discussing the efficient transfer of data, an example of a cloud storage system 108 is discussed by way of example and not limitation.

FIG. 1 illustrates a cloud storage system 108 that includes or is associated with an orchestration environment 110 and object storage 128. An example of an orchestration environment 110 is Kubernetes. Within the orchestration environment 110, the cloud storage system 108 may run or provide multiple processes, functions, or services, which are illustrated as microservices in this example.

Multiple instances of the microservices included in the orchestration environment 110 may be run at the same time. The load balancer 112 may be configured to distribute requests or transfers to different instances.

The microservices include an object access microservice 114 that is configured to provide access to buckets and objects in the object storage 128. The deduplication microservice 116 is configured to perform deduplication with respect to objects stored in the object storage 128. The deduplication microservice 116 may include or provide a datamover 122 that is configured to read objects (data) from the object storage 128 and/or write objects to the object storage 128. The garbage collection (GC) microservice 118 is configured to collect garbage and reclaim storage space in the object storage 128 by deleting objects that are no longer needed. The replication microservice 120 may be configured to replicate objects from one region to another region or, more generally, from a source to a target. Other microservices may be provided to perform other functions such as verification, authentication, or the like. Each microservice may run on one or more nodes or servers in the cloud storage system 108.

The object storage 128 is configured to store objects. When an object is stored in the object storage 128, the object may be chunked or divided into segments. The segments are stored in a manner that allows each segment to be associated with more than one object. This allows the objects to be deduplicated. When storing an object, the object is processed according to the specifics of the object storage 128. When retrieving or reading an object, the object is essentially reconstituted from the corresponding segments.

More specifically, storing an object may include dividing the object into slices. If the slice has a size of ~8 MB and a segment has a size of ~8 KB, each slice may be further divided into about 1000 segments. Next, a unique fingerprint or identifier is determined for each segment. In one example, the fingerprint of a segment is a hash of the segment. As a result, each fingerprint maps to a specific segment. The fingerprint should uniquely identify the segment. Deduplication can be achieved by comparing fingerprints. When fingerprints match, the corresponding segments are identical and duplicate segments do not need to be stored repeatedly.

This information allows the objects to be deduplicated and stored in the object storage 128 using recipes. An object recipe references one or more slice recipes. Each slice recipe includes a list of segment references and segment size. As previously stated, processing the object divides the object into slices and then divides the slices into segments. As a result, the slice recipe identifies, using the segment fingerprints, the segments corresponding to the slice of the object.

Next, each slice recipe is mapped to a similarity group and the similarity group references one or more compression regions. The similarity groups allow similar slices to be grouped. When multiple slices are mapped to the same similarity group, those slices are likely to include some of the same segments. This allows objects to be deduplicated.

FIG. 1 illustrates how objects are processed in the cloud storage system 108 and stored in the object storage 128. FIG. 1 illustrates an object recipe 130 that is associated with an object. In this example, the object identified by the object recipe 130 was divided into two slices and the object recipe 130 is mapped to or associated with the slice recipes 134 and 136. The slice recipe 134 is mapped to the similarity group 140 and the similarity group 140 is associated with the compression region 144. The compression region 144 stores the segments of the slice corresponding to the slice recipe 134.

Similarly, the object recipe 132 is associated with the slice recipe 138 and the slice recipe maps to the similarity group 142. The similarity group 142 maps to the compression region 146. As illustrated, the slice recipe 136 and the slice recipe 138 both map to the same similarity group 142. This indicates that some of the segments associated with the slice recipe 136 may be the same as the segments associated with the slice recipe 138.

By way of example, FIG. 1 illustrates that a similarity group may map or be associated with a set of compression regions and that compression regions can be associated with different slice recipes. For example, the slice recipe 136 has segments in the compression region 146 that are referenced by the slice recipe 138. A slice recipe may reference a single similarity group and the slice recipe's fingerprints reference segments in one or more compression regions that are referenced by that similarity group. The manner in which objects are stored and deduplicated in FIG. 1 is presented by way of example only. Embodiments of the invention extend to other storage paradigms.

Thus, the object recipe 130 is a data structure that references one or more slice recipes. The slice recipe 134 includes a list of segment references (fingerprints) and segment size. The similarity group 140 may include a list of fingerprints. The compression region 144 (which may represent multiple compression regions) includes multiple segments that are compressed together. In other words, each of the compression regions referenced by a similarity group includes multiple segments. In one example, each compression region or each set of compression regions is referenced from a single similarity group.

FIG. 1 illustrates that the cloud storage system 108 is accessible by a client 102, which is representative of multiple clients that may access the cloud storage system 108. FIG. 1 also illustrates a server 104. The server 104 is configured to improve the efficiency with which objects are transferred to and from the cloud storage system 108. The server 104 is typically located near the client 102 and is configured to communicate with the cloud storage system 108 to determine what objects (or portions thereof) need to be transmitted across the network.

The server 104 is configured to connect to the cloud storage system 108 and provide the efficient transfer of objects. In one example, the server 104 is configured to transfer objects using a protocol that is specific to the cloud provider, which may be different from the provider of the cloud storage system 108. For example, if the cloud storage system 108 is implemented in Amazon AWS using S3 object storage, the server LU 104 would allow for efficient transfer of data using the S3 protocol. The server 104 is not required to use a protocol that may be specific to the operation of the cloud storage system 108 itself. For example, if the cloud storage system 108 is implemented as a DELL Data Domain Cloud Tier, the server 104 may be configured to transfer data using S3 protocol rather that protocols specific to the Data Domain Cloud Tier or other system. The cloud storage system 108 may able be implemented as Dell EMC Elastic Cloud Storage (ECS). The objects, however, are stored according to the specifics of the cloud storage system 108. As previously stated, embodiments of the invention can be configured to operate with the storage systems of different providers and can adapt to different manners of storing objects or data.

In one example, the client 102 could interact with the cloud storage system 108 by configuring a cloud client (e.g., a software client running on the client 102) with credentials for the cloud storage system 108 and with a defined endpoint associated with the cloud storage system 108. As previously stated, performance issues may be experienced when sending data from the client 102 to the cloud storage system 108 when the client 102 is far away from where the cloud storage system 108 is deployed and hosted at least because network speeds may be affected by the distance. The distance may manifest itself in increased latency and slower throughput.

One purpose of the server 104 is to provide a more network efficient way for the client 102 (or a user) to send and receive data by performing local computations and identifying the minimal amount of data that needs to be transferred to and from the cloud storage system 108. This mitigates the reduced performance caused by increased distance from the cloud storage system 108. In addition to decreasing the amount of information sent across the network to the cloud storage system 108, the server 104 may also offload some of the computation and memory-intensive procedures that the cloud storage system 108 is normally responsible for in order to further improve performance.

A user can host the server 104 on their own machine (e.g., on the client 102 or in a closer network location) near their cloud client and configure their cloud client with their existing credentials. Further, the user may point the cloud client to an endpoint associated with the server 104 to efficiently transfer objects to and from the cloud storage system 108.

Figure 2:
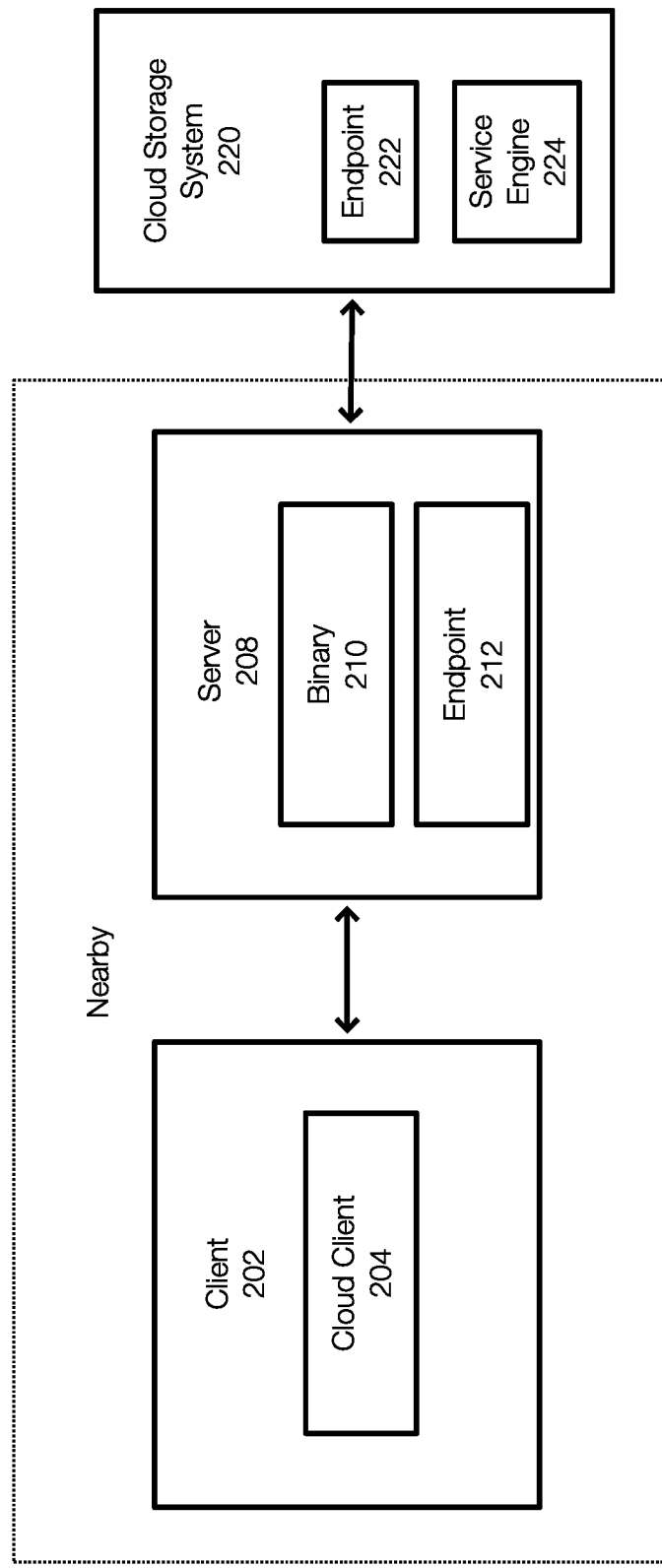
FIG. 2 discloses an example of a server that aids a client in transferring data to and from a cloud storage system.

FIG. 2 further illustrates a relationship between a client (e.g., a client machine or device) and a server. FIG. 2 illustrates a client 202 and a server 208. An example of the server 208 is a Minio S3 server, which provides compatibility with Amazon S3 storage. However, the server 208 may be configured with additional functionality as discussed herein. The server 208, by way of example only and in the context of Amazon AWS using S3 object storage, may provide an interface with which the client 202 can interact as if interacting with S3 itself. Consequently, embodiments of the invention allow the efficient transfer of data within the context of existing protocols associated with a cloud provider. Further, the cloud storage system can store the data in accordance with its own standards.

In this example, the server 208 runs close to the client 202. The server 208 may be packaged as a binary 210 that a user can run on their own machine (physical or virtual). In one example, the server 208 should be in close network proximity to the cloud client 204 running on the client 202. From a distance and network perspective, by way of example, the server 208 is much closer to the client 202 than the cloud storage system 220 in the cloud.

The server 208 (or the binary 210) accepts a host address and port that correspond to the endpoint where users would normally configure their cloud client 204 (e.g., S3 client) to point to. When running, the binary 210 exposes an endpoint 212. Users can point their cloud client 204 to the endpoint 212 rather than an endpoint 222 of the cloud storage system 220. In this example, requests from the cloud client 204 are issued to the endpoint 212 rather than the endpoint 222 of the cloud storage system.

The server 208 (or binary 210) is configured to communicate with the cloud storage system 220. To facilitate this communication, the cloud storage system 220 may also provide a service engine 224 that is configured to respond to or service calls from the server 208. For example, if the server 208 issues RPC calls, the service engine 224 is configured to respond to the RPC calls or other requests issued by the server 208. Once requests from the server 208 reach the cloud storage system, the requests are subject to the same authentication processes. The server 208 does not have access to the cloud provider credentials that are used by the cloud storage system 220 to interact with object storage such that there are no additional security considerations in one example.

By way of example, all requests from the client 202 (or from the cloud client 204) can be split into three categories: PUT requests, GET requests, and OTHER requests. As a request comes in, which may be in accordance with a protocol of the cloud provider, the server 208 identifies the request type and handles the request accordingly.

The PUT category of requests includes commands used for uploading objects to the cloud storage system. These may include writing a single object or writing an object part as part of a multipart upload process. The GET category of requests may refer to reading or accessing an object from the cloud storage system.

For PUT requests and GET requests, the server 208 is configured to run routines to minimize the amount of data transferred. In one example, the server runs as much of the request as possible locally. However, these requests may need information that is stored on object storage in the cloud storage system. Because the server does not have access to the cloud provider credentials, the server 208 cannot directly interact with the object storage of the cloud storage system. In one example, the server 208 may communicate with the cloud storage system using RPCs (Remote Procedure Calls) in order to perform some object storage related operations, such as retrieving the deduplication domain identifier associated with the user's account.

When the server 208 receives a PUT request, a series of communications (e.g., RPC calls, requests, or the like) are triggered between the server 208 and the cloud storage system 220. Part of these communications may include the server 208 forming a list of segments for a local object and then determining which of these segments already exist within the cloud storage system 220 and which are new segments that are not present in the cloud storage system 220. This allows a list of segments that are not stored in the cloud storage system 220 to be identified. The server 208 then transmits the segments missing from the cloud storage system 220 to the cloud storage system 220. The segments being transferred may be compressed (and/or encrypted). If there is any deduplication, the user gains the benefit of sending fewer bytes across the network.

For GET requests, the server 208 issues a get or read request. In response, the object slices are collected by the cloud storage system 220 and compressed by the cloud storage system 220 before being returned to the server 208. Once the slices are received by the server 208, the server decompresses the slices and reconstructs the object using the object recipe. Compressing the slices prior to transmission (from the cloud storage system 220) for GET requests improves performance because the amount of data transferred from the cloud storage system to the server 208 and to the client 202 is reduced.

OTHER requests may relate to operations such as, by way of example only, making a bucket, listing buckets or objects, and deleting buckets or objects. Some operations related to multipart uploads are also in the OTHER request category, including starting new multipart uploads, list multipart uploads, and aborting multipart uploads. Generally, OTHER requests are handled as passthrough requests. More specifically, the server 208, which receives the request, clones the request and forwards the request to the cloud storage system running in the cloud. The responses are routed through the server 208 to the client 202.

Figure 3:
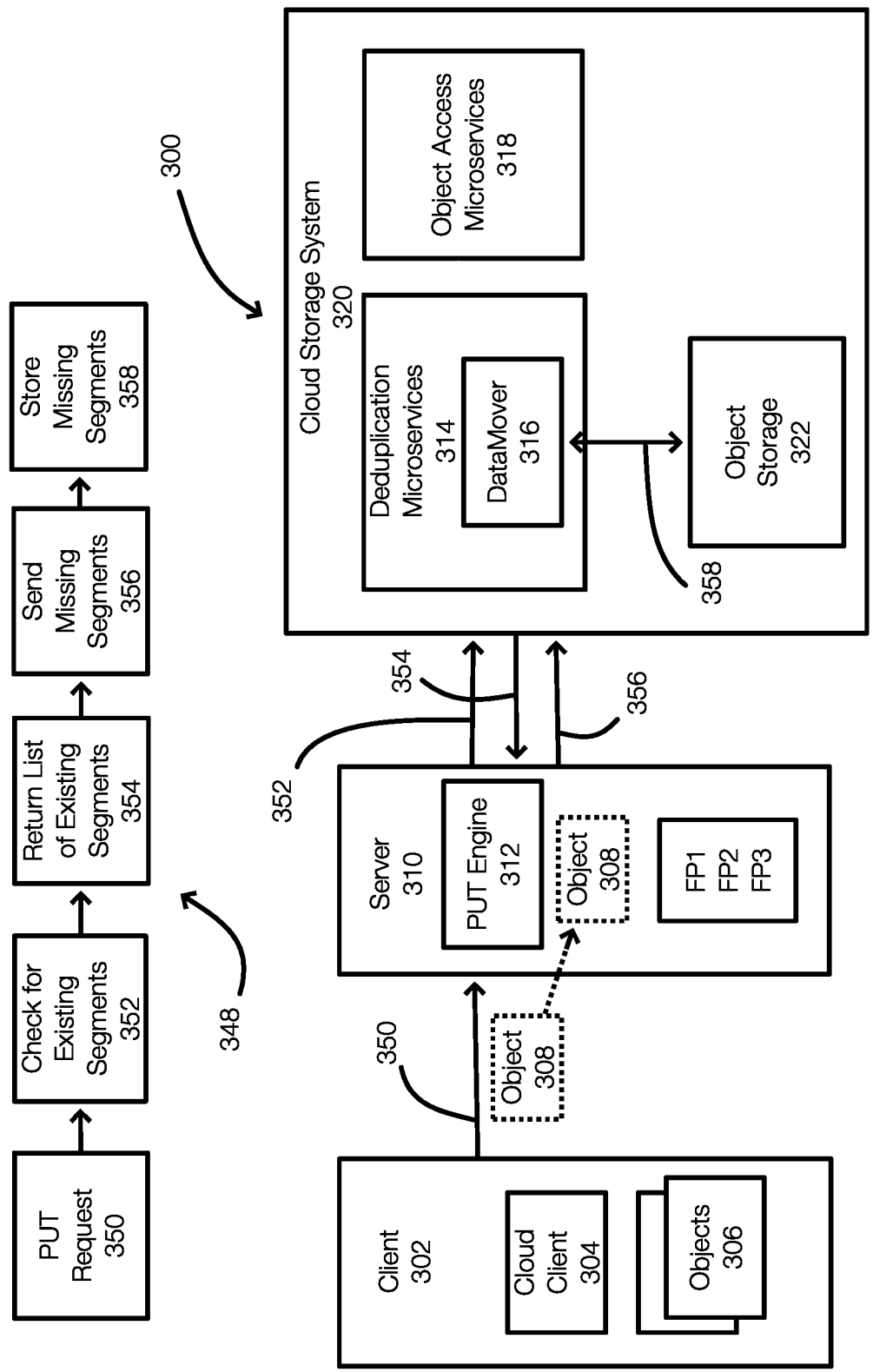
FIG. 3 illustrates an example of a computing system that performs a request such as a PUT request to put or write an object into the cloud storage system.

FIG. 3 illustrates an example of a server in communication with an object storage system and illustrates an example of a PUT request. FIG. 3 illustrates examples of a system 300 for performing a PUT request and a method 348 for performing a PUT request.

FIG. 3 illustrates a client machine or client 302 that cooperates with a server 310 to interact with the cloud storage system 320. A cloud client 304 may operate or run on the client 302. The client 302 may include, by way of example and when the cloud provider supports the S3 protocol, an S3 client that can be used as an interface to store data, retrieve data, and access data with respect to the cloud storage system 320. The client 302 may be associated with objects 306, which may be stored on local storage. The objects 306 may be generated or created at the client, modified at the client, or the like. The client 302 may modify an object downloaded from the object storage 322 of the cloud storage system 320.

The server 310 may include a PUT engine 312 that is configured to transfer an object or portion thereof or other data to the cloud storage system 320.

The cloud storage system 320 includes deduplication microservices 314 and object access microservices 318 and other microservices as illustrated in FIG. 1. The deduplication microservices 314 includes a datamover 316. The datamover 316 is typically configured to move objects into the object storage 322 and retrieve objects from the object storage 322.

The following example illustrates a process of PUTTING or writing an object 308 to the object storage 322. Initially, a PUT request is generated 350 at the client 302. The PUT request may be generated by or through the cloud client 304 and essentially corresponds to an instruction to write the object 308 to the cloud storage system 320. Thus, the PUT request and the object 308 are transferred to the server 310. The object 308 may simply be accessible to the server 310 in response to the PUT request or streamed during execution of the PUT request by the PUT engine 312.

Because the client 302 is accessing the cloud storage system 320 via the server 310 (the client 302 may be unaware of this fact), the PUT operation is distinct from a situation where the client 302 interacts directly with the cloud storage system 320.

Initially, a PUT request may cause the server 310 to make a series of RPC calls to the cloud storage system 320 in order to validate the credentials and command parameters such as confirming that the bucket in which the object 308 is to be stored exists. After initialization is complete, the server 310 may start an RPC connection with the cloud storage system 320 or, more specifically, the datamover 316. The datamover 316 may expose a variety of RPC functions that enable the deduplication of data, along with storage and retrieval of data or objects stored in the object storage 322.

After connecting to the datamover 316, a handshake procedure may be initiated between the server 310 and the datamover 316 to establish a secure connection. As part of this initial process, a data transfer context is created that provides information about the object to be transferred into the cloud storage system 320 and more specifically into the object storage 322. Internally, the data transfer context is a structure that contains information about the data transfer such as the transfer identifier, the hostname and port of the source and the destination, the destination access key, and the object name. The data transfer context is sent to the datamover 316 with the handshake.

After the handshake is established, another RPC call is made from the server 310 to the deduplication microservice 314 to check 352 whether the object 308 to be transferred already exists in the object storage 322. If the object 308 does not exist, then the efficient transfer process continues.

The process of checking 352 whether the object 308 exists in the cloud storage system 320 or in the object storage 322 includes several steps or acts. The server 310 may determine or generate fingerprints associated with the object 308 and construct compression regions to send to the cloud storage system 320.

More specifically, the server 310 may read the object 308 (e.g., in a streaming manner) and form slices using the PUT engine 312. Using the slices, the server 310 then constructs slice recipes for the object 308 and makes an RPC call to the datamover 316 to check each slice recipe. As previously stated, the slice recipe contains a list of segment identifiers or fingerprints (e.g., FP1 FP2, FP3) and segment sizes. When checking the slice recipe, the datamover 316 reads in a local similarity group on the cloud storage system 320 and queries for the fingerprints in the slice recipe received from the server 310. The similarity group used for comparison purposes can be determined by generating a similarity group identifier (ID) The similarity group identifier often can be generated from the slice or the slice recipe. For example, when forming the slice recipe, a similarity group ID (e.g., a byte counting number) is generated in one of several ways. The minimum (or maximum) fingerprint of the fingerprints in the slice recipe may be selected and four bytes may be selected from that fingerprint. Alternatively, a sketch may be calculated over the data of the slice, which is a hash over subregions that meet a mathematical property. Such generated values may then be processed through a further hash function to spread their value over the full range. The similarity group read in by the datamover 316 can be identified by similarity group ID associated with the slice recipe. The datamover 316 can compare the fingerprints in the slice recipe with the fingerprints in the similarity group to identify segments missing from the similarity group.

Fingerprints from the slice recipe that are not found in the similarity group, are added to a list of missing fingerprints by the datamover 316. The list of missing fingerprints (or list of existing segments) is returned 354 to the server 310. Either list allows the server 310 to identify the missing segments. Next, the server 310 (or the PUT engine 312) forms compression regions for the missing segments associated with the missing fingerprints and sends 356 the missing segments to the data mover 316. More specifically, the server 310 sends a transfer compression region RPC call to the datamover 316 with the slice recipe and the newly formed compression region. In response to this RPC call, the datamover 316 stores 358 the missing segments in the object storage 322. More specifically, the datamover 316 stores the new compression region in object storage 322, updates the similarity group with fingerprints, and stores the slice recipe in the object storage 322. Once this process is complete for all the missing fingerprints and all of the slice recipes associated with the object recipe, the server 310 copies or sends the object recipe to the cloud storage system 320 using an RPC call to the datamover 316, which stores the object recipe in the object storage 322.

FIG. 3 illustrates an example of a PUT request and a method 348 of writing to the object storage 322 that reduces the amount of data transferred over the network connecting the server 310 with the cloud storage system 320. Only missing segments (plus some other comparatively small data such as fingerprints and other metadata) are transferred during execution of the PUT request. The procedure of processing an object to obtain the object recipe, slice recipe, compression regions, and the like are offloaded to the server 310 and may be performed outside of the cloud storage system 320. In addition, the server 310 may communicate with the cloud storage system 320 using a protocol of the cloud provider even though the cloud storage system 320 may be associated with different protocols.

Figure 4:
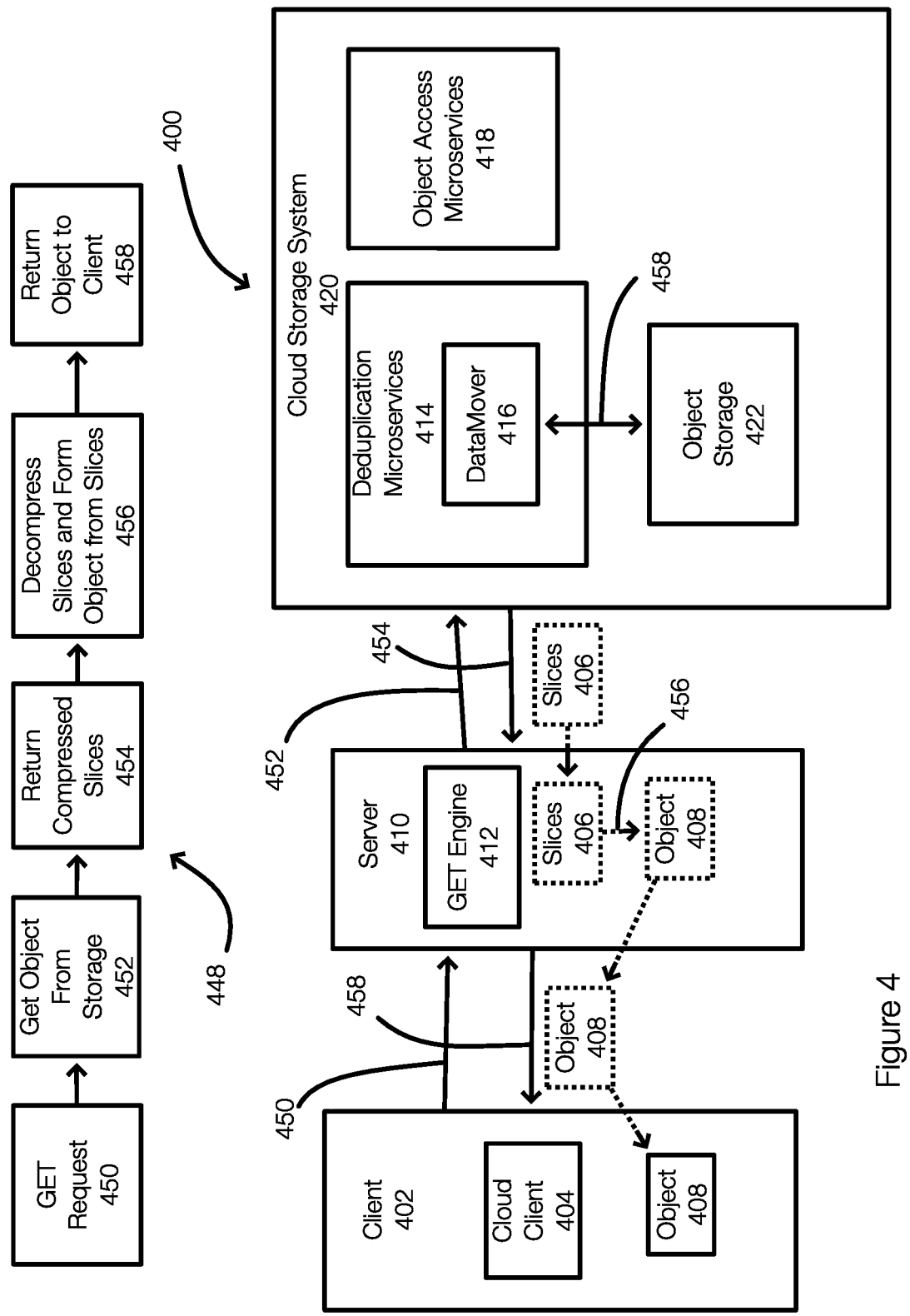
FIG. 4 illustrates an example of a computing system that performs a request such as a GET request to retrieve or read an object from the cloud storage system.

FIG. 4 illustrates an example of a server in communication with cloud storage system and illustrates an example of a GET request. FIG. 4 illustrates examples of a system 400 for performing a GET request and a method 448 for performing a GET request.

In this example, the server 410 includes a GET engine 412, which may be integrated with the PUT engine shown in FIG. 3. Generally, these engines may be referred to as a request engine that is configured to handle requests from the client 402. The cloud storage system 420 includes deduplication microservices 414 and object access microservices 418 and other services. The deduplication microservices 414 may include the datamover 416.

In this example, the cloud client 404 may issue a GET request or command for an object stored in the cloud storage system 420 or, more specifically, in the object storage 422 of the cloud storage system. Thus, a GET request is received 450 at the server 410 from the client 402 or the cloud client 404.

After receiving the GET request, the server 410 performs the GET path, which includes at least some steps that are identical to the PUT path. For example, the server 410 may issue a series of RPC calls to the cloud storage system 420 in order to validate the credentials and command parameters such as confirming that the bucket exists. Following these calls, the server 410 is prepared to read objects from the object storage 422.

The server 410 may create multiple threads for reading objects. These threads issue RPC calls to the deduplication microservices 414 to obtain an object or multiple objects. Thus, the server 410 sends 452 a request to get the object from the storage 422.

When the call is received, the datamover 416 may use the object recipe to identify the slices and corresponding compression regions of the requested object. Based on the fingerprints in the slice recipe, the corresponding segments can be retrieved from the compression regions. Thus, the slices 406 corresponding to the object can be retrieved and prepared for transfer.

In order to transfer data efficiently, the slices may be compressed after retrieving the segments from the object storage 422. The type of compression may be specified. Next, the compressed slices are transferred 454 to the read slice threads (the GET engine 412) operating on the server 410. The GET engine 412 decompresses the slices and forms 456 the object 408. The decompressed slices may be stitched together or arranged or ordered to form 456 the object 408. The object access microservices 418 may be responsible for putting the slices together for transport and/or identifying how the slices should be arranged at the server 410.

In this example of FIG. 4, the server 410 is forming the object at a location that is close to the client 402 rather than in the cloud. Once the object 408 is formed, the server 410 responds to the GET request from the client 402 and returns 458 the reconstructed object 408 to the client 402. In one example, the server 410 may not require any local storage during a GET request at least because decompressing and stitching occurs in a streaming manner.

Figure 5:
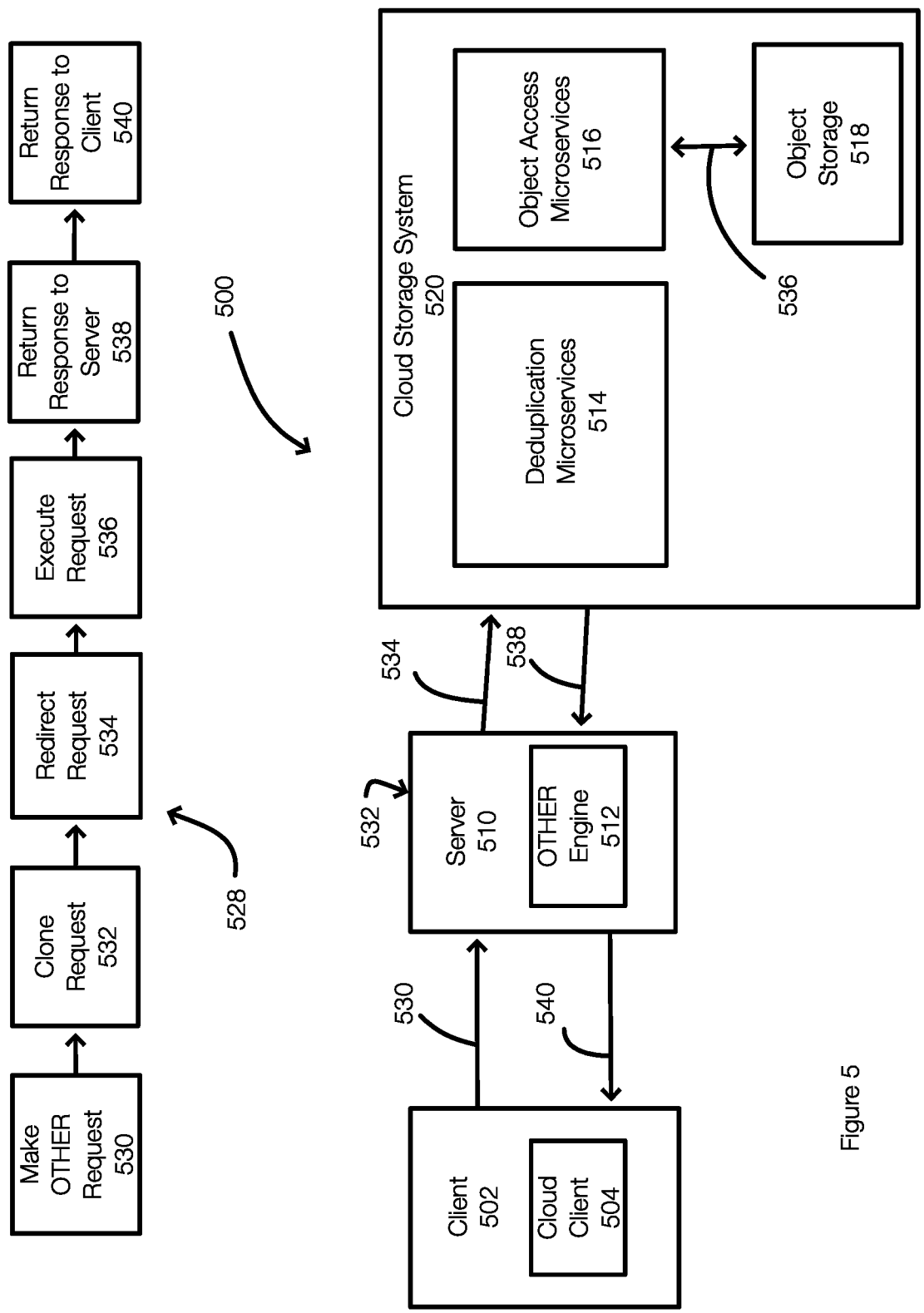
FIG. 5 illustrates an example of a computing system that performs other requests related to the cloud storage system.

FIG. 5 illustrates an example of a server in communication with an object storage system and illustrates an example of an OTHER request. FIG. 5 illustrates examples of a system 500 for performing an OTHER request and a method 528 for performing an OTHER request with respect to a cloud storage system 520.

Examples of OTHER requests or operations include commands that may be performed by the object access microservices. The OTHER operations or requests include commands such as listing buckets or objects, deleting buckets or objects, and making buckets. A multipart upload procedure (during a multipart PUT operation, the PUT request may be executed for each part) includes multiple OTHER operations in addition to a PUT operation. For instance, the method of starting a new multipart upload, aborting a multipart upload, and listing multipart uploads are considered OTHER operations.

The OTHER method for the server uses a passthrough mechanism to leverage the existing handling logic used by the OTHER routine for the cloud storage system running in the cloud. When the user issues 530 an OTHER request with cloud client 504 that points to an endpoint of the server 510, the server 510 identifies the request type as OTHER with the OTHER engine 512, which may be part of the request engine. An OTHER request is then performed by the OTHER engine 512 or, more generally, the server 510. The server 510 reads the request body into a new IO (Input/Output) reader. The server 510 then clones 532 the OTHER request by constructing a new HTTP request with the IO reader. Instead of using the server's 510 endpoint as the URL, the server 510 uses the endpoint of the cloud storage system 520 as the URL for the OTHER request.

The server 510 may then initialize a temporary HTTP client and send or redirect the request 534 to the cloud storage system 520 endpoint. The cloud storage system 520 sees the request not as a redirected request in one example, but as a normal request following the appropriate protocol. The cloud storage system 520 then executes 536 the request. Often, OTHER requests are executed by the object access microservices 516, while PUT and GET requests are performed by the datamover, which is associated with the deduplication microservices 514.

The cloud storage system 520 (or the object access microservices 516) returns 538 the response or acknowledgment to the server 510. A response (e.g., success, error, failure) is then returned 540 to the client 502. The response may be displayed at the client 502. The client 502 is unaware of the HTTP request forwarding performed by the server 510 and displays the result of the OTHER request to the user.

The server 510 is thus configured to redirect or send an OTHER request to the object access microservices 516 for processing.

Figure 6:
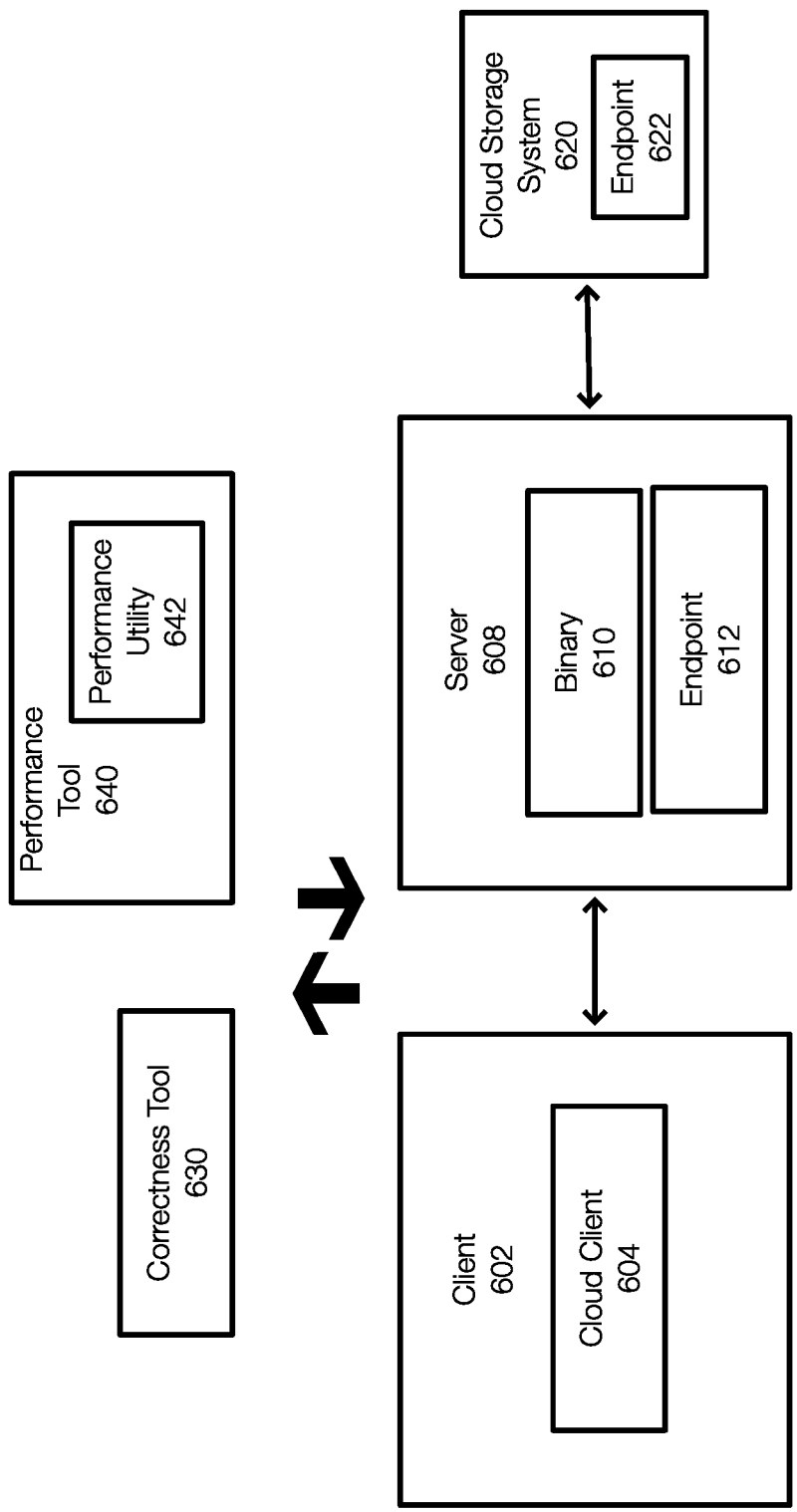
FIG. 6 illustrates an example of tools for testing data transfer efficiency.

FIG. 6 illustrates testing tools for testing the data transfer efficiency. With reference to FIG. 6, two testing tools were developed to verify the functionality and increased performance provided by the server 608. One tool is a correctness tool 630 that goes through a general list of commands related to a protocol such as S3 and checks for the expected results. The other tool is a performance tool 640 that measures the number of bytes transferred and the amount of time to transfer the bytes for PUT and GET requests or operations from the client 602 to the server 608 compared to transferring the time to transfer the bytes from the client 602 directly to the cloud storage system 620.

The correctness tool 630 may implement or include a script that acts as the client 602 or cloud client 604 with a set of ordered commands. The script requires two inputs in one example—the endpoint 622 of the cloud storage system 620 and the endpoint 612 of the server 608 or the binary 610. To act as a user (or client) that sends commands or requests to the server 608, the correctness tool 630 uses, by way of example and not limitation, s3cmd as the client for S3 protocol to make requests. First, the script expects the server 608 and the cloud storage system 620 to be running and initializes the test by checking whether or not the necessary s3cmd is locally installed. If s3cmd is available, the correctness tool 630 queries the cloud storage system 620 for a new set of user credentials and configures s3cmd to use those credentials. The tool 630 also sets s3cmd to point to the endpoint 612 of the server 608.

After s3cmd client configuration is complete, the correctness tool 630 issues commands to server 608 as the new user. The first request may be a list buckets command, which is an example of an OTHER request. This command and expects to find zero buckets because the user has not created any buckets yet. The correctness tool 630 then makes a bucket and lists buckets to find one bucket. Next, the correctness tool 630 makes a second bucket, lists buckets to find two buckets, deletes the new bucket, and lists buckets to find one bucket.

To test PUT requests or commands, the tool 630 generates two local files of random data, one file of size 10 MB to test a single object upload and the other file of size 100 MB to test a multipart upload. The object size necessary to trigger a multipart upload is configurable. The correctness tool 630 calls a PUT command to write the 10 MB file to the previously created bucket and then does a list objects commands, expecting one object as the output. The tool 630 then does a GET command on the newly uploaded 10 MB file and compares the md5sums of the downloaded file to the original file. The checksums should match. This process on the 10 MB file is repeated for the 100 MB file. To end the test, the correctness tool 630 deletes the objects one by one and does a list objects command after each delete to check the delete object functionality. As clean up, the test then removes the local 10 MB and 100 MB files and reports the total experiment time.

The performance tool 640 is designed to measure the transfer time and bytes for performing GET and PUT requests or commands from a client 602 to a server 608 as compared to a scenario where the client 602 is directly connected with the cloud storage system 620. Similar to the correctness tool 630, the performance tool 640 expects the server 608 and the cloud storage system 620 to be running and requires that the s3cmd is installed as well as a performance utility 642 that leverages s3cmd. This utility of the performance tool 640 may be a synthetic data generator that can create many objects of a specified size as well as versions of objects that are changed from an earlier version according to parameter settings controlling the rate and types of changes. If the environment meets all mentioned requirements, the performance tool 640 first starts PUT and GET tests for the server 608.

This process begins by querying the cloud storage system 620 for a new set of user credentials and configuring the s3cmd to use those credentials with the server's 608 endpoint. Then the performance tool 640 uses a performance utility 642 to write related objects using the same lineage of varying sizes to the server 608. For instance, the tool 640 runs a series of PUT commands for 1 MB, 10 MB, 100 MB, 1 GB and 10 GB objects and records the duration of each write and number of bytes sent with each write. The number of bytes are retrieved from the logs of the deduplication microservices. The performance tool 640 also performs a similar test for the GET command using s3cmd to perform a series of reads for the previously uploaded objects and records the time duration of the test and the number of bytes sent. After the tests are complete for the server 608, the performance tool 640 repeats this process with new user credentials for testing the cloud storage system 620 when directly connected with the client 602.

At the end of the all tests, the performance tool 640 returns an output log containing the sizes of the objects uploaded, the experiment times and bytes transferred for PUTs and GETs for the server 608 and for the cloud storage system 620. The results of numerous performances tests illustrate that both the number of bytes transferred and the amount of time to complete the transfer for both PUT and GET commands becomes increasingly less when using the server 608 (compared to directly connecting with the cloud storage system 620) as the object size increases, highlighting the benefits of efficient transfer.

Figure 7:
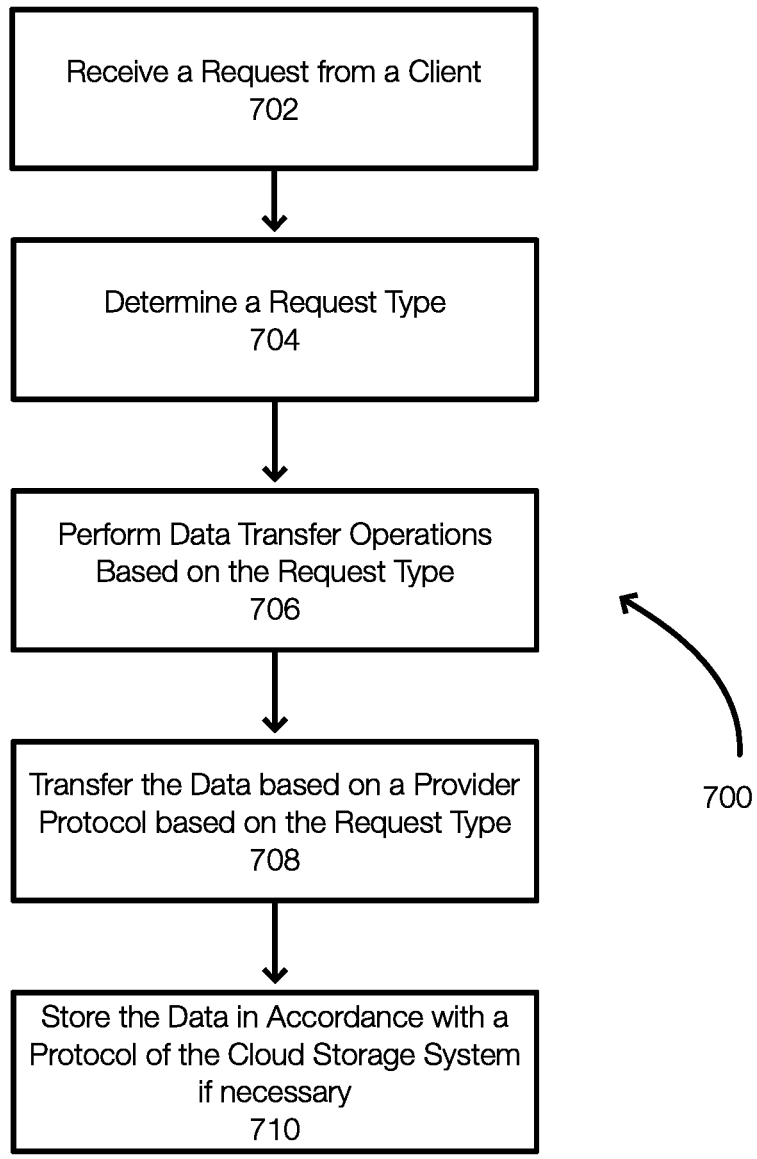
FIG. 7 illustrates an example of a method for performing data transfer operations in a cloud storage system.

FIG. 7 illustrates an example of a method for efficiently transferring data to and from a cloud storage system. The method 700 often begins when a server receives 702 a request from a client. Upon receipt of the request, the server determines 704 the request type. The request type may be a PUT, GET or OTHER request by way of example only. Next, the server performs 706 data transfer operations based on the determined request type. For PUT requests, this may include preparing the object by dividing the object into slices, dividing the slices into segments, and generating a fingerprint for each segment. The data transfer operations may also include communicating with the cloud storage system to identify which of the segments are not stored by the cloud storage system. This may require the fingerprints to be transmitted. However, the fingerprints are much smaller than the segments themselves.

After the missing segments are identified, the data or segments are transferred 708 based on a cloud provider protocol, which may be different from protocols associated with the cloud storage system. The data is then stored 710 in accordance with the protocols of the cloud storage system if necessary (GET requests and OTHER requests may not require objects to be stored in the cloud storage system).

In one example, a cloud provider may be Amazon Web Service, Microsoft Azure, Google Cloud Platform, and others. The cloud storage system, by way of example, may be Data Domain Cloud Tier.

When the request is a GET request, the requested object may be retrieved from the object storage of the cloud storage system. This may include sending a request for the object. In response, the object is retrieved from the object storage. In one example, the object is retrieved in pieces or slices. The slices are compressed and transmitted to the server. The server decompresses and stitches the decompressed slices together. The reconstructed object is then returned to the client.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data transfer operations. Such operations may include, but are not limited to, data read/write/delete operations, data deduplication operations, data backup operations, data restore operations, data cloning operations, data archiving operations, read operations, write operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way.

Embodiment 1. A method comprising receiving a request from a client at a server, wherein the request is associated with an object to be placed in the cloud storage system, processing the object, by the server, to generate segments and to generate fingerprints that include a fingerprint for each of the segments, sending the fingerprints, by the server, to the cloud storage system, wherein the cloud storage system compares the fingerprints received from the server with fingerprints stored at the cloud storage system, receiving a list of missing fingerprints at the server from the cloud storage system, wherein the list of missing fingerprints identifies segments of the object that are not stored at the cloud storage system, and sending, by the server, the segments corresponding to the list of missing fingerprints to the cloud storage system.

Embodiment 2. The method of embodiment 1, further comprising processing the object by dividing the object into one or more slices.

Embodiment 3. The method of embodiment 1 and/or 2, further comprising processing the object by dividing each of the one or more slices into segments.

Embodiment 4. The method of embodiment 1, 2, and/or 3, further comprising compressing the segments corresponding to the list of missing fingerprints.

Embodiment 5. The method of embodiment 1, 2, 3, and/or 4, wherein the server operates using a first protocol that is different from a protocol of the cloud storage system.

Embodiment 6. The method of embodiment 1, 2, 3, 4, and/or 5, further comprising incorporating the segments corresponding to the list of missing fingerprints into the cloud storage system Embodiment 7. The method of embodiment 1, 2, 3, 4, 5, and/or 6, further comprising communicating with the cloud storage system, by the server, using remote procedure calls.

Embodiment 8. The method of embodiment 1, 2, 3, 4, 5, 6, and/or 7, further comprising configuring the client to point to an endpoint of the server.

Embodiment 9. The method as recited in any of embodiments 1-8 or portions thereof.

Embodiment 10. A method for transferring objects to and from a cloud storage system, the method comprising receiving a request from a client at a server with regard to an object, wherein the client is configured to direct the request to an endpoint of the server, determining a request type of the request by the server, performing data transfer operations based on the determined request type, wherein the data transfer operations are configured to reduce an amount of data transferred between the server and the cloud storage system, transferring the data based on a protocol associated with a cloud provider, and storing the data in accordance with a protocol of the cloud storage system.

Embodiment 11. The method of embodiment 10, wherein the request type is one of a PUT request, a GET request, and an OTHER request.

Embodiment 12. The method of embodiment 10 and/or 11, when the request type is the PUT request, the method further comprising preparing, by the server, an object for transmission by dividing the object into slices and dividing the slices into segments, communicating, by the server, with the cloud storage system to identify which segments of the object not stored at the cloud object storage, and transferring only the segments of the object that are not stored at the cloud object storage to the cloud storage system, wherein the cloud storage system incorporates the missing segments into the cloud object storage.

Embodiment 13. The method of embodiment 10, 11, and/or 12, when the request type is the GET request, the method further comprising communicating, by the server, with the cloud storage system to request an object, wherein the object is divided into slices and the slices are divided into segments, receiving compressed slices from the cloud storage system at the server, decompressing, at the server, the compressed slices, stitching the decompressed slices together to reconstruct the object, and returning the reconstructed object to the client.

Embodiment 14. The method of embodiment 10, 11, 12, and/or 13 further comprising decompressing the compressed slices while streaming the compressed slices without landing the compressed slices at the server.

Embodiment 15. The method of embodiment 10, 11, 12, 13 and/or 14 further comprising reconstructing the decompressed slices at the server while streaming to the client.

Embodiment 15. A method for performing any of the operations, methods, or processes, or any portion of any of these, disclosed herein.

Embodiment 16. A non-transitory storage medium having stored therein instructions that are executable by one or more hardware processors to perform the operations of any one or more of or portions thereof of embodiments 1 through 15.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device. As well, where any of the aforementioned elements comprise or consist of a virtual machine (VM), that VM may constitute a virtualization of any combination of the physical components disclosed herein.

In one example, the physical computing device includes a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein including.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for transferring data to a cloud storage system from a client, the method comprising:
   receiving a request from a client at a server, wherein the request is associated with an object to be placed in the cloud storage system;
   processing the object, by the server, to generate segments and to generate fingerprints that include a fingerprint for each of the segments;
   sending the fingerprints, by the server, to the cloud storage system, wherein the cloud storage system compares the fingerprints received from the server with fingerprints stored at the cloud storage system;
   receiving a list of missing fingerprints at the server from the cloud storage system, wherein the list of missing fingerprints identifies segments of the object that are not stored at the cloud storage system; and
   sending, by the server, the segments corresponding to the list of missing fingerprints to the cloud storage system.

2. The method of claim 1, further comprising processing the object by dividing the object into one or more slices.

3. The method of claim 2, further comprising processing the object by dividing each of the one or more slices into segments.

4. The method of claim 1, further comprising compressing the segments corresponding to the list of missing fingerprints.

5. The method of claim 1, further comprising incorporating the segments corresponding to the list of missing fingerprints into the cloud storage system.

6. The method of claim 1, further comprising communicating with the cloud storage system, by the server, using remote procedure calls.

7. The method of claim 1, further comprising configuring the client to point to an endpoint of the server.

8. A non-transitory storage medium having stored therein instructions that are executable by one or more hardware processors to perform operations comprising:
   receiving a request from a client at a server, wherein the request is associated with an object to be placed in the cloud storage system;
   processing the object, by the server, to generate segments and to generate fingerprints that include a fingerprint for each of the segments;
   sending the fingerprints, by the server, to the cloud storage system, wherein the cloud storage system compares the fingerprints received from the server with fingerprints stored at the cloud storage system;
   receiving a list of missing fingerprints at the server from the cloud storage system, wherein the list of missing fingerprints identifies segments of the object that are not stored at the cloud storage system; and
   sending, by the server, the segments corresponding to the list of missing fingerprints to the cloud storage system.

9. The non-transitory storage medium of claim 8, the operations further comprising processing the object by dividing the object into one or more slices.

10. The non-transitory storage medium of claim 9, the operations further comprising processing the object by dividing each of the one or more slices into segments.

11. The non-transitory storage medium of claim 8, the operations further comprising compressing the segments corresponding to the list of missing fingerprints.

12. The non-transitory storage medium of claim 8, the operations further comprising incorporating the segments corresponding to the list of missing fingerprints into the cloud storage system.

13. The non-transitory storage medium of claim 8, the operations further comprising communicating with the cloud storage system, by the server, using remote procedure calls.

14. The non-transitory storage medium of claim 8, the operations further comprising configuring the client to point to an endpoint of the server.

* * * * *